(12) United States Patent
Bazinski et al.

(10) Patent No.: US 10,189,186 B2
(45) Date of Patent: Jan. 29, 2019

(54) METHOD FOR FINISHING MATCHING SURFACES IN FORMING TOOL COMPONENTS

(71) Applicant: Ford Global Technologies, LLC, Dearborn, MI (US)

(72) Inventors: Steve Norman Bazinski, Amherstburg (CA); Warwick J. Smith, Grosse Pointe Woods, MI (US); Satyanarayana Raju Vemulapati, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 724 days.

(21) Appl. No.: 14/279,734

(22) Filed: May 16, 2014

(65) Prior Publication Data
US 2015/0328802 A1 Nov. 19, 2015

(51) Int. Cl.
| | | |
|---|---|---|
| *B23K 26/36* | (2014.01) | |
| *B29C 33/38* | (2006.01) | |
| *B23K 26/362* | (2014.01) | |
| *B23K 26/361* | (2014.01) | |

(52) U.S. Cl.
CPC ........ *B29C 33/3842* (2013.01); *B23K 26/361* (2015.10); *B23K 26/362* (2013.01); *B29K 2905/12* (2013.01); *Y10T 29/49773* (2015.01); *Y10T 29/49863* (2015.01)

(58) Field of Classification Search
CPC .......................... B23K 26/362; B23K 26/361; B29C 33/3842; B29K 2905/12; Y10T 29/49773; Y10T 29/49863
USPC ................. 219/219, 121.67–121.69, 121.72; 29/407.05, 445; 451/28
See application file for complete search history.

(56) References Cited

U.S. PATENT DOCUMENTS

| | | | | |
|---|---|---|---|---|
| 4,363,849 A | * | 12/1982 | Paisley | .............. B29C 44/0407 |
| | | | | 215/355 |
| 5,465,780 A | * | 11/1995 | Muntner | .................. B22C 9/04 |
| | | | | 164/369 |
| 6,039,556 A | | 3/2000 | Jens et al. | |
| 6,096,254 A | | 8/2000 | Nielsen | |
| 6,203,911 B1 | * | 3/2001 | Weberg | ..................... C08F 4/38 |
| | | | | 428/413 |
| 6,930,277 B2 | | 8/2005 | Gallant et al. | |

(Continued)

*Primary Examiner* — Ibrahime A Abraham
*Assistant Examiner* — Biniam Asmelash
(74) *Attorney, Agent, or Firm* — Vichit Chea; Price Heneveld LLP

(57) ABSTRACT

A method for forming a tool for creating a formed component includes providing a forming tool having a core and cavity with respective core and cavity shutoff bands. Core and cavity finished parting planes are determined, wherein the engagement of the core and cavity finished parting planes defines a forming cavity. Rough portions of the core and cavity shutoff bands are removed to define respective rough parting planes. The respective rough parting planes are offset by approximately 130 microns from the respective core and cavity finished parting planes. The core and cavity are semi-finished to relieve stress within the core and cavity. The core and cavity shutoff bands are fine cut so that outer surfaces of the core and cavity shutoff bands are equal to the respective finished parting planes. The engagement between the core and cavity outer surfaces is substantially free of gaps.

8 Claims, 7 Drawing Sheets

(56) References Cited

U.S. PATENT DOCUMENTS

| | | | |
|---|---|---|---|
| 8,042,268 B2 * | 10/2011 | Arrell | B21D 53/78 164/34 |
| 8,074,701 B2 * | 12/2011 | Paul | B22C 7/026 164/27 |
| 8,617,242 B2 | 12/2013 | Philipp | |
| 2003/0011106 A1 * | 1/2003 | Osaki | B29C 33/3842 264/401 |
| 2004/0178537 A1 * | 9/2004 | Polosky | B81C 99/0085 264/328.16 |
| 2006/0073235 A1 * | 4/2006 | Ringer, Sr. | B29C 45/2602 425/556 |
| 2008/0000611 A1 | 1/2008 | Bunker et al. | |
| 2012/0177772 A1 * | 7/2012 | Judd | B29C 33/565 425/542 |

* cited by examiner

METHOD FOR FINISHING MATCHING SURFACES IN FORMING TOOL COMPONENTS

FIELD OF THE INVENTION

The present invention generally relates to a method for forming tools used in the creation of vehicle components, and more specifically, a method for refining surfaces of tools to create more precise parting-line surfaces for forming tools.

BACKGROUND OF THE INVENTION

Many components of vehicles are created through injection or compression molding processes where material is placed within a forming tool by being disposed within a cavity. Material can be disposed within the cavity in several methods that can include, in the case of a compression form, opening the form and placing the material within a forming cavity of the forming tool, where the compression tool joins together to compress the material into a predetermined shape that defines the vehicle component. In the case of an injection tool, the forming tool is joined together and the material is injected into the forming cavity to define the shape of the vehicle component.

SUMMARY OF THE INVENTION

According to one aspect of the present invention, a method for forming a tool for creating a formed component includes providing a forming tool having a core with a core shutoff band and a cavity with a cavity shutoff band. Core and cavity finished parting planes are determined, wherein the engagement of the core and cavity finished parting planes defines a forming cavity within the core and cavity. Rough portions of the core and cavity shutoff bands are removed to define a core rough parting plane and a cavity rough parting plane, respectively. The core and cavity rough parting planes are offset by at most approximately 130 microns from the respective core and cavity finished parting planes. The core and cavity are semi-finished, wherein the semi-finishing step relieves material stress within the core and cavity. The core and cavity shutoff bands are fine cut, wherein core and cavity outer surfaces of the core and cavity shutoff bands are substantially equal to the respective core and cavity finished parting planes, and wherein the engagement between the core and cavity outer surfaces is substantially free of gaps.

According to another aspect of the present invention, a tool-forming method includes the steps of providing a core and cavity having core and cavity parting planes extending respectively therethrough. Portions of the core and cavity distal from the respective core and cavity parting planes are removed. The core and cavity are stress relieved and the core and cavity are refined to define respective core and cavity shutoff bands that are substantially equal with the respective core and cavity parting planes.

According to another aspect of the present invention, a tool-forming method includes the steps of providing a forming tool having core and cavity shutoff bands with mating core and cavity parting planes that extend respectively therethrough. Portions of the core and cavity shutoff bands distal from the core and cavity parting planes are removed and the forming tool is stress relieved. The core and cavity shutoff bands are refined to be substantially equal to the core and cavity parting planes.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
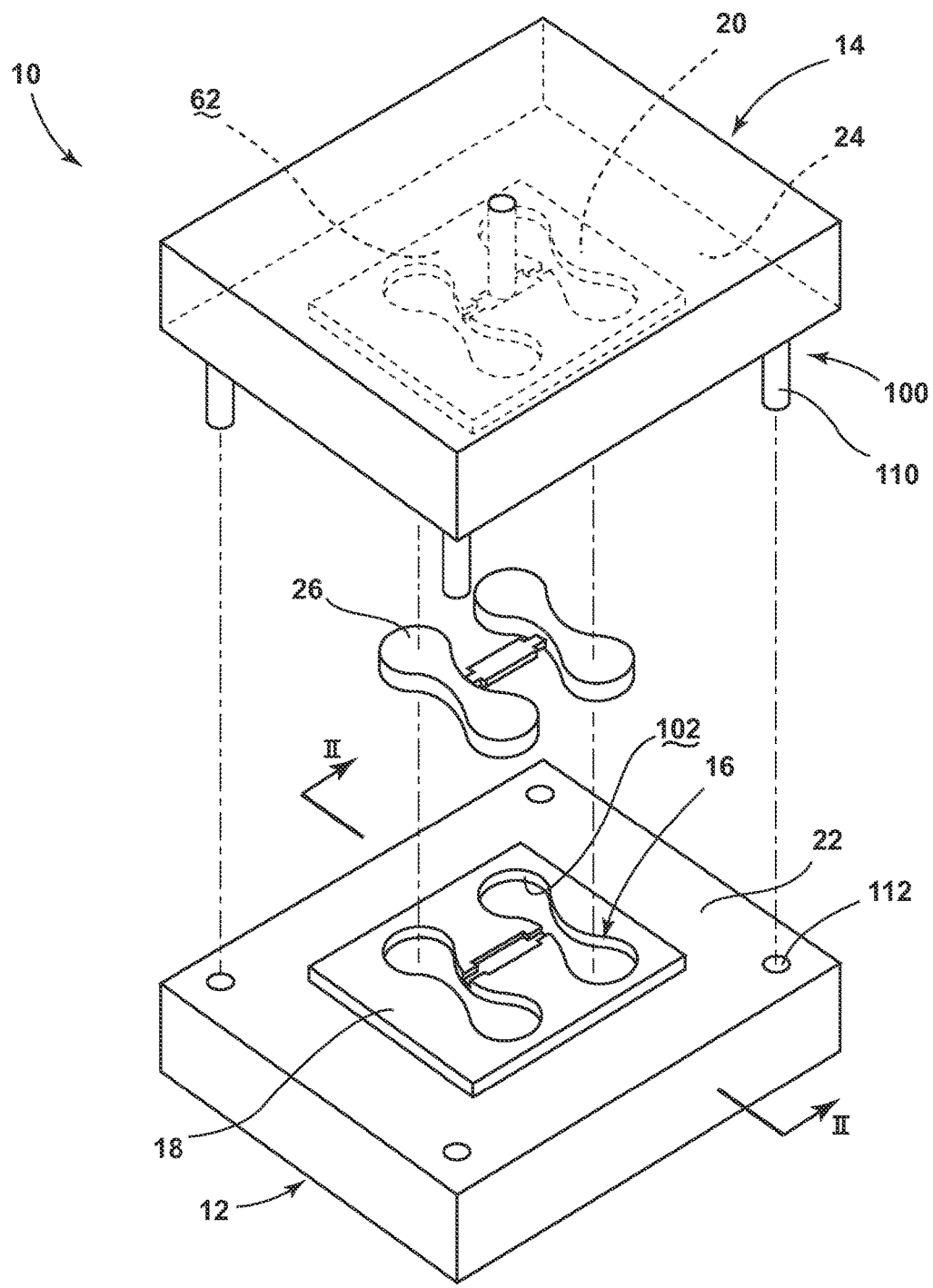
FIG. 1 is a top perspective view of a core and cavity of a forming tool formed according to an embodiment of a method for creating a forming tool.
Figure 2:
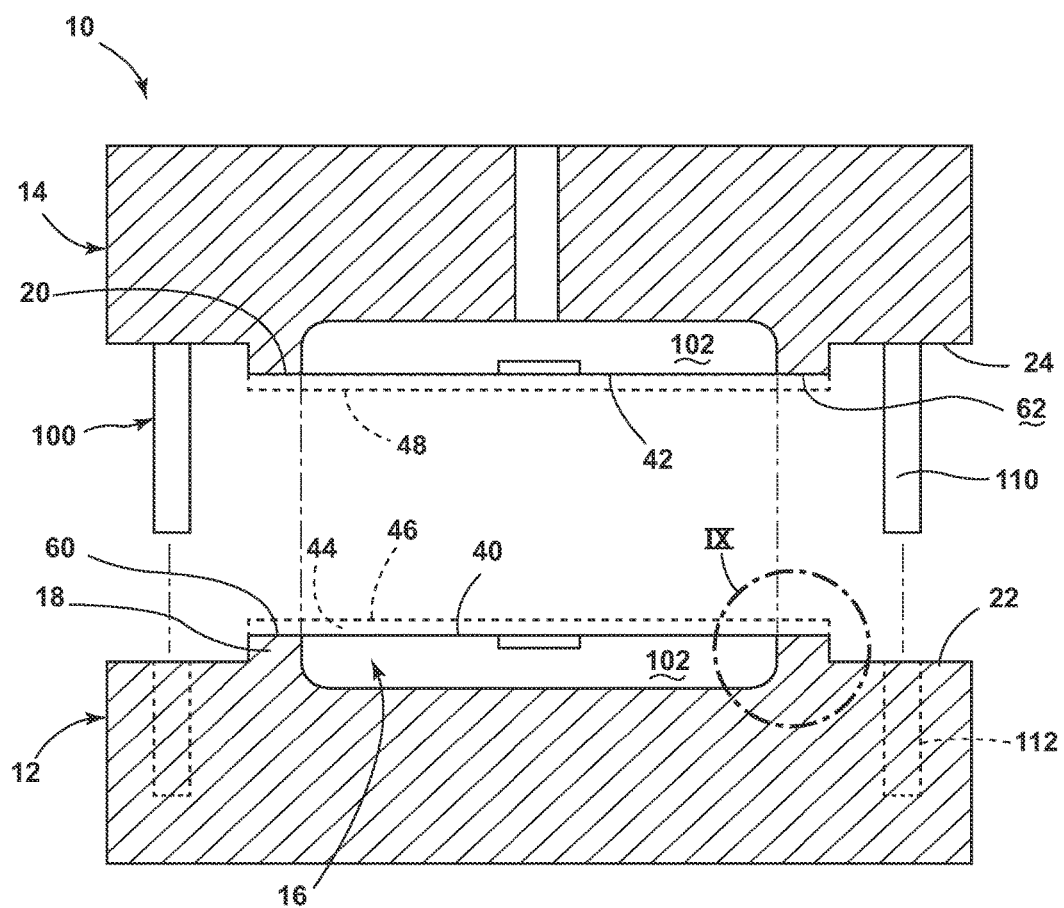
FIG. 2 is a cross-sectional view of the forming tool of FIG. 1 taken along line II-II.
Figure 3:
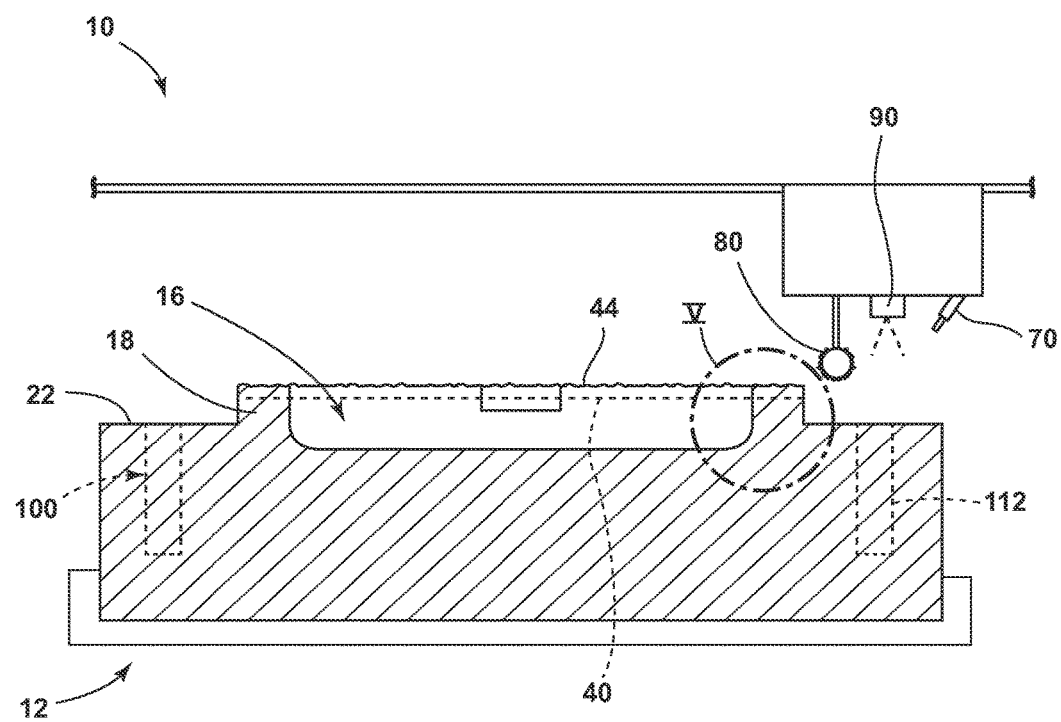
FIG. 3 is a cross-sectional view of a core of a forming tool created using an alternate embodiment of a method for creating a forming tool.
Figure 4:
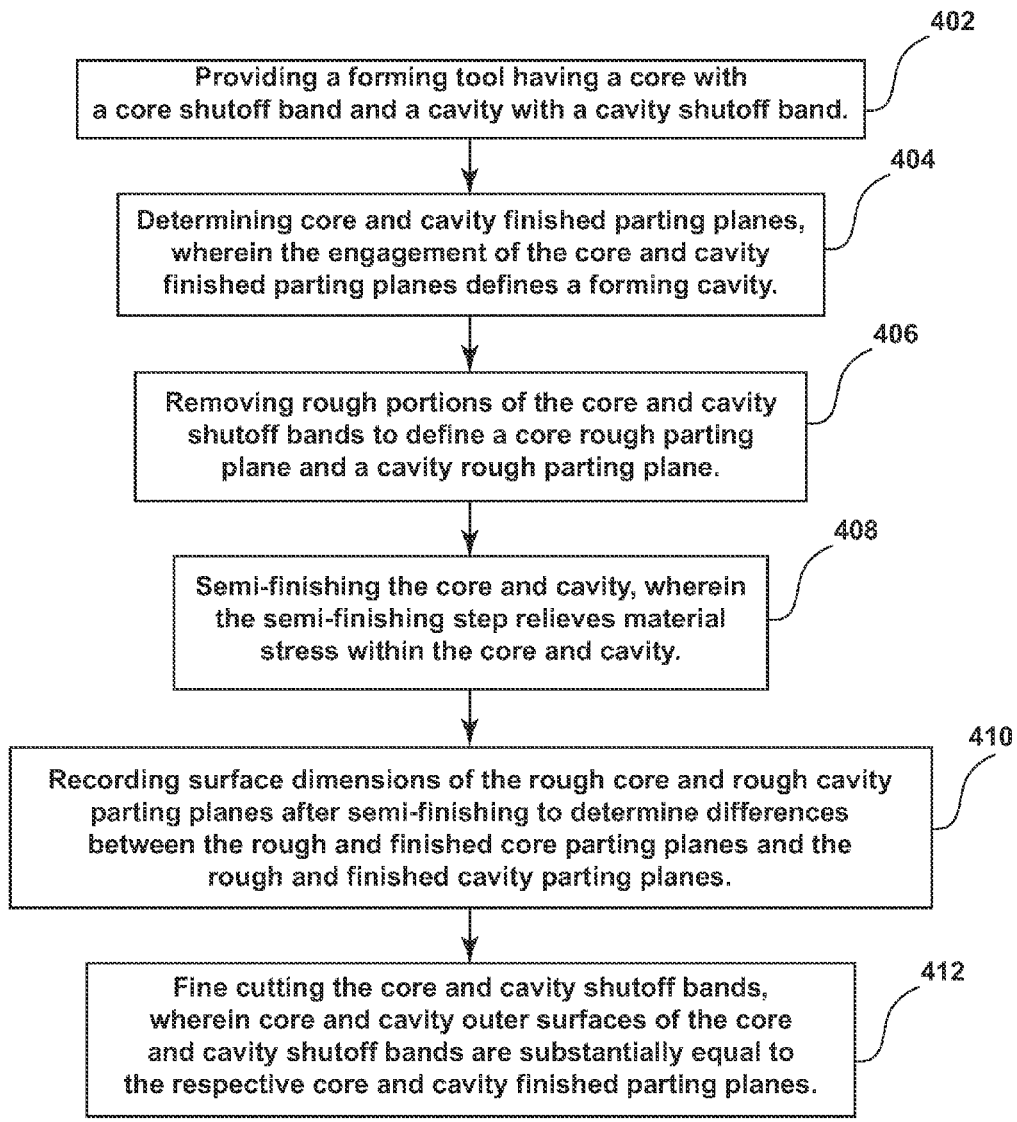
FIG. 4 is a schematic flow diagram illustrating an embodiment of the method for forming a tool for creating a vehicle component.
Figure 5:
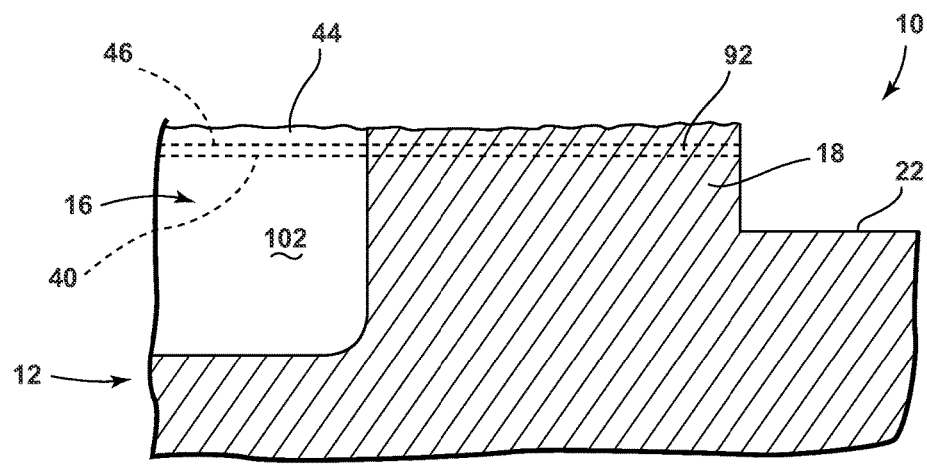
FIG. 5 is a detail cross-sectional view of the core of the forming tool of FIG. 3 taken at area V.
Figure 6:
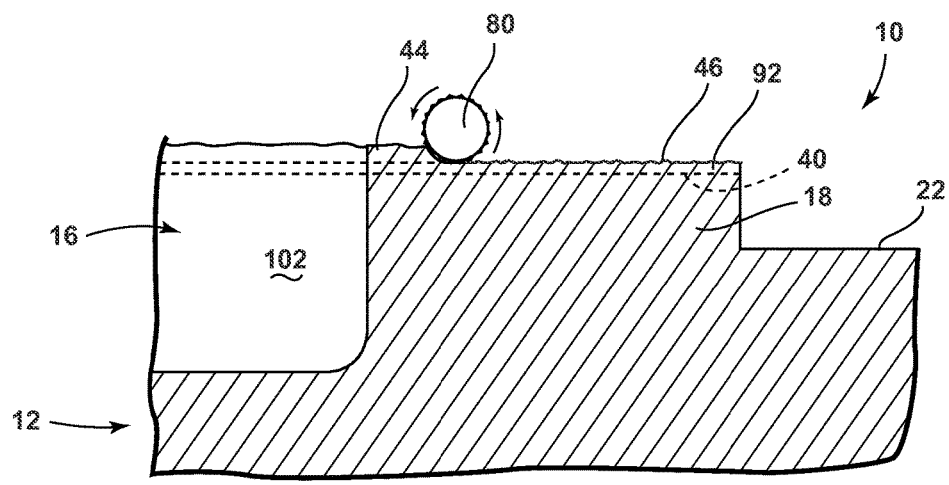
FIG. 6 is a detail cross-sectional view of FIG. 5 showing the removal of a rough portion of the core according to one embodiment of the method.
Figure 7:
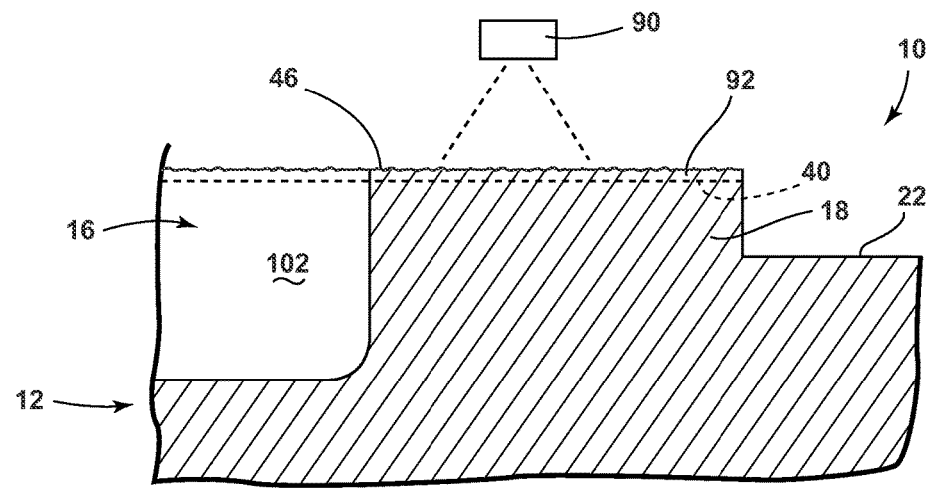
FIG. 7 is a detail cross-sectional view of the embodiment of FIG. 6 showing a scanning apparatus recording the area to be removed in a fine-cutting step according to one embodiment.
Figure 8:
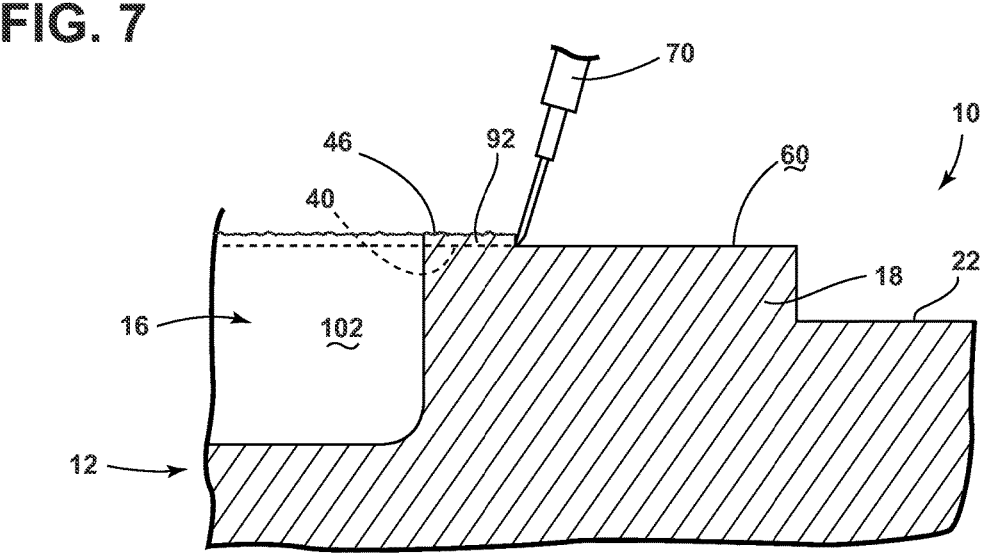
FIG. 8 is a detail cross-sectional view of the embodiment of FIG. 7 showing a fine cutting laser removing a portion of the core according to an embodiment of the method for creating a forming tool.
Figure 9:
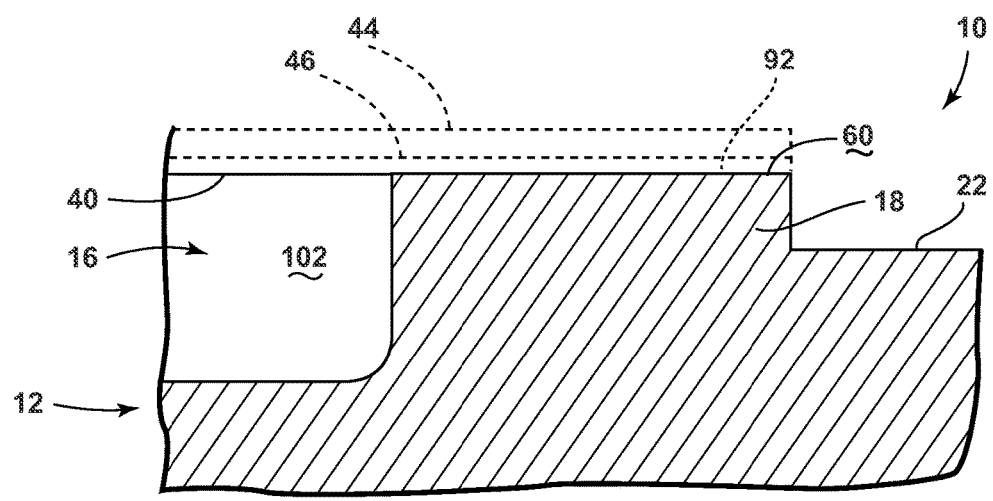
FIG. 9 is a detail cross-sectional view of the core of the forming tool of FIG. 2 taken at area IX that has been created according to the method for creating a forming tool, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-9, reference numeral 10 generally refers to a forming tool that is created according to any one of the various embodiments described herein for forming a core 12 and cavity 14 for the forming tool 10 that meet to define a forming cavity 16 within which various components, such as a vehicle component 26, is created. Such formed components can also be made for various items including, but not limited to, appliances, toys, equipment, and other items.

Referring again to FIGS. 1-3, the forming tool 10 created according to the method described herein includes the core 12 and cavity 14 of the forming tool 10 that join to form the forming cavity 16 of the forming tool 10. It is contemplated that the forming cavity 16 is bound by the core and cavity shutoff bands 18, 20 that meet to further define the forming cavity 16. The engagement of the core and cavity shutoff bands 18, 20 is configured to contain the formable material within the forming cavity 16 such that minimal amounts of the formable material, if any, extends between the core and cavity shutoff bands 18, 20 during the forming process of the vehicle component 26. Where formable material does extend between the core and cavity shutoff bands 18, 20, this material is called "flash" where the connection between the core 12 and cavity 14 is visible within the surface of the forward vehicular component 26. The existence of flash on a formed vehicle component 26 can result in unnecessary expense as a result of additional steps in the manufacturing process devoted to remaining flash. As such, vehicle components that include flash can make the process for forming vehicle components more inefficient. Extending beyond the core and cavity shutoff bands 18, 20 are respective core and cavity runoff bands 22, 24 that are configured to extend from the core and cavity shutoff bands 18, 20 substantially to the edge of the respective core 12 and cavity 14. In the various embodiments, it is contemplated that the core and cavity shutoff bands 18, 20 can have a width of approximately 1 inch to approximately 2 inches. It is also contemplated that narrower or wider core and cavity shutoff bands 18, 20 can be implemented for the forming tool 10.

Referring now to FIGS. 4-9, according to one embodiment for a method 400 for creating a forming tool 10 for creating a vehicle component 26, the method 400 includes providing a forming tool 10 having a core 12 with a core shutoff band 18 and a cavity 14 with a cavity shutoff band 20 (step 402). The location of respective core and cavity finished parting planes 40, 42 is determined, wherein the engagement of the core and cavity finished parting planes 40, 42 defines the forming cavity 16 defined within the core 12 and cavity 14 as well as the core and cavity shutoff bands 18, 20 (step 404). Once the location of the core and cavity finished parting planes 40, 42 is determined, rough portions 44 of the core and cavity shutoff bands 18, 20 are removed to define a core rough parting plane 46 and a cavity rough parting plane 48, within the core 12 and cavity 14, respectively (step 406). The core and cavity rough parting planes 46, 48 are offset by, at most, approximately 130 microns from the respective core and cavity finished parting planes 40, 42. After removal of the rough portions 44 of the core and cavity shutoff bands 18, 20, the core 12 and cavity 14 are semi-finished, wherein the semi-finishing step relieves material stresses within the core 12 and cavity 14 (step 408). The semi-finishing step 408 can include any one or more of various processes that are adapted to strengthen and harden the material of the core 12 and cavity 14. Such semi-finishing processes can include, but are not limited by, annealing, tempering, and other similar processes. After the semi-finishing step is substantially complete, the core and cavity shutoff bands 18, 20 are fine cut, wherein core and cavity outer surfaces 60, 62 of the respective core and cavity shutoff bands 18, 20 are defined such that the core and cavity outer surfaces 60, 62 are substantially equal to the respective core and cavity finished parting planes 40, 42 (step 412). In this manner, the engagement between the core and cavity outer surfaces 60, 62 of the respective core 12 and cavity 14 is substantially free of gaps. In the various embodiments, it is contemplated that the forming tool 10 can be any cavity-forming tool including, but not limited to, an injection forming tool, a compression forming tool, a blow molding tool, or others, according to various embodiments.

During formation of the forming tool 10, according to the embodiments described herein, the fine-cutting step 412 to define the core and cavity outer surfaces 60, 62 at the core and cavity shutoff bands 18, 20 can be performed by a cutting laser 70 that is adapted to refine the core and cavity outer surfaces 60, 62 to within approximately 10 microns or less of the designed core and cavity finished parting planes 40, 42. In this manner, the outer surfaces of the core and cavity shutoff bands 18, 20, when engaged, form a substantially mating fit that is free of gaps, spaces, or other imperfections that might allow the formable material disposed within the forming cavity 16 from bleeding out of the forming cavity 16 and between the outer surfaces of the core and cavity shutoff bands 18, 20. The level of precision that can be achieved through the method 400 described herein can substantially limit the amount of flash present on the various vehicle components 26 formed within the forming tool 10 in the various types of cavity-forming tools.

Referring again to FIGS. 3-6, before the core 12 and cavity 14 of the forming tool 10 are refined according to the method 400 described herein, the core and cavity shutoff bands 18, 20 extend beyond the core and cavity finished parting planes 40, 42 as determined during the design of the core 12 and cavity 14 of the forming tool 10. In this manner, the core and cavity finished parting planes 40, 42 are defined within at least a portion of the core 12 and cavity 14, respectively. In the various embodiments, the removal of the rough portions 44 of the core and cavity shutoff bands 18, 20 can be performed by a computer numerical controlled (CNC) cutting machine 80. The CNC cutting machine 80 can include various cutting mechanisms that can include, but are not limited to, high pressure water jets, saws, grinders, cutting lasers, combinations thereof, as well as other various cutting machines that can be configured to remove the rough portions 44 of the core and cavity shutoff bands 18, 20 to within approximately 130 microns of the respective core and cavity finished parting planes 40, 42. The CNC cutting machine 80 can be placed in communication with a processor that can calculate the appropriate cutting parameters and can also direct the performance of the various cutting operations of the CNC cutting machine 80. It is contemplated that the core and cavity rough parting planes 46, 48, after removal of the rough portions 44 of the core and cavity shutoff bands 18, 20, can be greater than 130 microns. Where additional material is to be removed during the fine cutting step, more powerful cutting lasers 70 can be implemented to remove the additional material included within the rough portion 44 of the core and cavity shutoff bands 18, 20. Conversely, where the CNC cutting machine 80 can create core and cavity rough parting planes 46, 48 that are less than 130 microns from the respective core and cavity finished parting planes 40, 42, less powerful cutting lasers 70 may be implemented to remove the rough portions 44 of the core and cavity shutoff bands 18, 20.

In the various embodiments, the rough portions 44 of the core 12 and cavity 14 that are removed by the CNC cutting machine 80 are positioned distal from the respective core and cavity finished parting planes 40, 42. In this manner, the appropriate tolerances can be achieved between the core and cavity rough parting planes 46, 48 and the core and cavity finished parting planes 40, 42.

Referring now to FIGS. 3-6, once the rough portions 44 of the core and cavity shutoff bands 18, 20 have been removed, the core 12 and cavity 14 can be semi-finished, by annealing, tempering or other similar process, to remove stresses within the core 12 and cavity 14 that are experienced as a result of the removal of the rough portions 44 of the core and cavity shutoff bands 18, 20. In the various embodiments, the semi-finishing step is performed by heating the core 12 and cavity 14 to a predetermined temperature. The predetermined temperature necessary for relieving the stresses within the core 12 and cavity 14 can be based upon several factors, including, but not limited to, the material of the core 12 and cavity 14, the size and shape of the core 12 and cavity 14, as well as other factors. In the various embodiments, the core 12 and cavity 14 can be made of various materials that can include, but are not limited to, steel, aluminum, beryllium, combinations and alloys thereof, and other substantially rigid and sturdy materials that can be used for compression and injection forming tools. By way of explanation, and not limitation, the semi-finishing temperature for steel is typically between about 550°-660° C. It is contemplated that these materials may have different semi-finishing temperatures. After heating, the core 12 and cavity 14 can be cooled down at a substantially slow rate to minimize tensions that can be caused by temperature differences within the material. The rate of cooling can also be determined by the material, the size and shape of the core 12 and cavity 14, as well as other factors. By way of example, and not limitation, certain materials, such as copper, can be cooled either quickly or slowly to achieve the desired strengthening and hardening as a result of the various semi-finishing processes. Conversely, other materials, such as steel, typically require a slow cooling process to achieve the desired strengthening and hardening characteristics.

In the various embodiments, the semi-finishing step of the method can be beneficial where portions of the forming tool 10 can be made of different grades of steel or other material. The semi-finishing step can account for these different grades of material that may have various imperfections. This step may also account for conditions where the materials that make up the forming tool 10 may come from multiple sources. Additionally, the stresses caused by the removal of the rough portions 44 of the forming cavity 16 can cause unwanted dimension changes within the core 12 and cavity 14 that can affect the engagement of the outer surface of the core and cavity shutoff bands 18, 20 after the fine cutting step is complete. By performing the semi-finishing step of the method 400, imperfections within the material and dimension changes as a result of the removal of the rough portions 44 of the core 12 and cavity 14 can be substantially minimized to create a substantially continuous surface engagement between the outer surfaces of the core and cavity shutoff bands 18, 20 that can minimize flash during the forming process. The semi-finishing step can create a forming tool 10 that includes a substantially consistent strength and integrity throughout the forming tool 10.

Referring again to FIGS. 3-8, after the semi-finishing step is complete, the core and cavity rough parting planes 46, 48 that are exposed after the removal of the rough portions 44 of the core 12 and cavity 14 are recorded by a scanning apparatus 90 to determine the surface dimensions of the core and cavity rough parting planes 46, 48 (step 410). In this manner, the differences between the core rough and core finished parting planes 46, 40 and the cavity rough and cavity finished parting planes 48, 42 are determined. These differences are recorded and programmed into the fine-cutting apparatus, such as the cutting laser 70, so that the fine-cutting apparatus can be specifically programmed to remove substantially precise finishing portions 92 of the core and cavity shutoff bands 18, 20. Accordingly, the outer surfaces of the core and cavity shutoff bands 18, 20 are refined to be substantially similar to the core and cavity finished parting planes 40, 42 with an accuracy of within approximately 10 microns. In the various embodiments, the scanning apparatus 90 can include three-dimensional scanning capabilities that are configured to form a three-dimensional virtual model of the core and cavity rough parting planes 46, 48 so that substantially precise measurements can be made of the finishing portions 92 bound between the core and cavity rough parting planes 46, 48 and the respective core and cavity finished parting planes 40, 42.

In the various embodiments, it is contemplated that a second semi-finishing step can be performed after the finishing portions 92 of the core and cavity shutoff bands 18, 20 are removed by the cutting laser 70. In this manner, various stresses placed upon the core 12 and cavity 14 as a result of the fine-cutting process (step 412) can be minimized. The use of a second semi-finishing step may be more desirable where the area defined by the finishing portions 92 is greater, such that more material is removed by the cutting laser 70.

In the various embodiments, it is also contemplated that a second surface-scanning step can be included within the method 400 before the removal of the rough portions 44 of the core and cavity shutoff bands 18, 20. In this manner, the CNC cutting machine 80 can receive the data captured by the scanning apparatus 90 to determine the proper amount of the core and cavity shutoff bands 18, 20 to remove in order to arrive at the proper distance between the core and cavity rough parting planes 46, 48 and the core and cavity finished parting planes 40, 42.

Referring again to FIGS. 1 and 2, the core 12 and cavity 14 can include various mating engagement portions 100 that are configured to align a forming-cavity surface 102 of the core 12 and a forming-cavity surface 102 of the cavity 14. In such embodiments, the outer surfaces of the core and cavity shutoff bands 18, 20 extend toward the forming cavity 16 and engage the forming cavity 16 at the forming-cavity surfaces 102 of the core 12 and cavity 14. During formation of the vehicle component 26, flash can also be created within the vehicle component 26 due to lack of lateral alignment between the core 12 and cavity 14. In this manner, the portion of the vehicle component 26 formed within the core 12 can be misaligned with the portion of the vehicle component 26 formed within the forming cavity 16. According to the various embodiments, the mating engagement portions 100 of the core 12 and cavity 14 can laterally align the core 12 and cavity 14 to substantially place the forming-cavity surface 102 of the core 12 in alignment with the forming-cavity surface 102 of the cavity 14 to substantially minimize the resulting flash that may occur through misalignment of the core 12 and cavity 14. The mating engagement portions 100 of the core 12 and cavity 14 can include mating protrusions 110 and recesses 112, tongue and groove engaging mechanisms, as well as other contoured mating surfaces defined within the core 12 and cavity 14. It is contemplated that the mating engagement portions 100 of the core 12 and cavity 14 can be formed through the same process described herein, wherein the process described herein for refining the core and cavity shutoff bands 18, 20 can be used to precisely define the parameters of the mating engagement portions 100 of the core 12 and cavity 14.

While the phrase "parting planes" is used within the method 400 described herein, it is contemplated that the core and cavity rough parting planes 46, 48 and the core and cavity finished parting planes 40, 42 can be substantially flat and planar surfaces. In alternate embodiments, it is contemplated that the core and cavity rough parting planes 46, 48 and the core and cavity finished parting planes 40, 42 can include the various contours that extend beyond a horizontal plane defined through the core 12 and cavity 14, respectively. In this manner, it is contemplated that the mating engagement portions 100 of the core 12 and cavity 14 can be defined within the core and cavity shutoff bands 18, 20. Accordingly, the various steps within the method 400, including, but not limited to, the removal of rough portions 44 of the core 12 and cavity 14, the various scanning steps, and the fine-cutting step 412 can include formation of the mating engagement portions 100 of the core 12 and cavity 14.

In the various embodiments, it is contemplated that the forming tool 10 can be made up of one or more cores 12 and/or one or more cavities 14 such that the forming tool 10 can be made up of three or more components that define the forming cavity 16 therebetween. It is further contemplated that the formable material disposed within the forming cavity 16 can be a substantially plastic material that can be compressed to form a predetermined shape or injected, blown, or otherwise projected into a predetermined space to define a predetermined shape. Such materials can include, but are not limited to, plastics, polymers, composites, combinations thereof, and other substantially formable materials that can be used in compression and injection forms to form various components.

According to the various embodiments described herein, the method can be used to form any one of various vehicle components 26 including, but not limited to, interior trim pieces, interior paneling, shields and guards in the engine compartment, as well as others. As discussed above, the various embodiments of the method can also be used to form components for items other than vehicles.

It is contemplated that the various mechanisms included within the method 400 described above can be contained within a single apparatus or can be contained within a plurality of separate apparatuses where the various steps are performed by separate mechanisms.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A tool-forming method comprising steps of:
   providing a core and a cavity that include respective core and cavity shutoff bands, the core and cavity being made entirely of steel with mating core and cavity parting planes that extend respectively therethrough;
   removing portions of the core and cavity shutoff bands that are distal from the core and cavity parting planes;
   stress relieving the core and cavity through tempering, wherein the core and cavity are heated to a temperature of from 550 degrees Celsius to 660 degrees Celsius, and wherein the core and cavity are then cooled at a slow rate to achieve a consistent hardness through the steel of the core and the cavity; and
   refining exposed steel surfaces of the respective core and cavity shutoff bands, wherein the steel of the core and the steel of the cavity are removed to expose the core and cavity parting planes.

2. The method of claim 1, wherein the core and cavity are incorporated within one of an injection forming tool and a compression forming tool.

3. The method of claim 1, wherein the step of providing a core and a cavity includes determining the location of the core and cavity parting planes, relative to the core and cavity shutoff bands.

4. The method of claim 3, wherein the method further includes the steps of:
   recording surface dimensions of the core and cavity shutoff bands after the stress relieving step is complete to determine rough core and rough cavity shutoff surfaces; and
   comparing the rough core and rough cavity shutoff surfaces to the locations of the core and cavity parting planes to determine the portions of the core and cavity shutoff bands that need to be removed to make an outer surface of the core and cavity shutoff bands equal to the core and cavity parting planes.

5. The method of claim 1, wherein the core and the cavity include mating engagement portions configured to align a core form surface with a cavity form surface.

6. The method of claim 1, wherein the step of refining the core and cavity shutoff bands is performed by a laser.

7. The method of claim 1, wherein the step of stress relieving the core and cavity through tempering relieves stresses in the steel of the core and the steel of the cavity resulting from the removing step.

8. The method of claim 4, wherein the rough core and rough cavity shutoff surfaces are offset from the respective core and cavity parting planes by at most 130 microns.

* * * * *